US011307433B2

(12) United States Patent
Lacaze et al.

(10) Patent No.: US 11,307,433 B2
(45) Date of Patent: Apr. 19, 2022

(54) ACOUSTICALLY ADJUSTABLE LENSES

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 189 days.

(21) Appl. No.: 16/797,248

(22) Filed: Feb. 21, 2020

(65) Prior Publication Data

US 2021/0263330 A1 Aug. 26, 2021

(51) Int. Cl.
| | |
|---|---|
| *G02B 27/64* | (2006.01) |
| *G02B 27/01* | (2006.01) |
| *G02C 7/02* | (2006.01) |
| *G02B 27/00* | (2006.01) |
| *G02C 7/04* | (2006.01) |
| *G02B 23/02* | (2006.01) |
| *G10K 11/30* | (2006.01) |

(52) U.S. Cl.
CPC ............. *G02B 27/64* (2013.01); *G02B 23/02* (2013.01); *G02B 27/0093* (2013.01); *G02B 27/017* (2013.01); *G02C 7/022* (2013.01); *G02C 7/04* (2013.01); *G10K 11/30* (2013.01)

(58) Field of Classification Search
CPC ........ G10K 11/30; G02B 23/02; G02B 27/64; G02B 27/0093; G02B 27/017; G02C 7/022; G02C 7/04

USPC ......................................................... 359/554
See application file for complete search history.

(56) References Cited

U.S. PATENT DOCUMENTS

| | | | | | |
|---|---|---|---|---|---|
| 4,802,182 | A | * | 1/1989 | Thornton | H01S 5/34 372/50.1 |
| 4,979,176 | A | * | 12/1990 | Young | G02F 1/11 372/13 |
| 5,465,171 | A | * | 11/1995 | Weber | G02F 1/125 359/287 |
| 5,757,987 | A | * | 5/1998 | Presby | G02F 1/0134 385/7 |
| 5,963,569 | A | * | 10/1999 | Baumgart | G02F 1/113 372/28 |

(Continued)

*Primary Examiner* — William R Alexander
(74) *Attorney, Agent, or Firm* — RowanTree Law Group, PLLC; Carson C. K. Fincham

(57) ABSTRACT

The present invention describes a system for changing the properties of the lenses to create changes in focus, magnification, and optical stabilization without changing the shape of the lens or moving the lenses. It uses an acoustic wave that when propagated through the lenses, creates a standing wave that changes the diffractive capabilities of the lens. It involves the properties of many materials to change the diffractive properties when subjected to acoustic waves. The acoustic waves are generally accomplished with a piezo electric transducer or modulator. The frequencies used are in the RF range, depending on the substrate. Substrates used include glass and silicon, as well as more esoteric transparent materials. The system described in the present invention involves the development of a lensing mechanism that comprises one or more acoustio-optic modulator(s), a transparent or semi-transparent substrate where the modulation is applied, and a non-parallel standing wave being propagated in the substrate.

29 Claims, 6 Drawing Sheets

(56) References Cited

U.S. PATENT DOCUMENTS

| | | | | |
|---|---|---|---|---|
| 8,873,131 B2* | 10/2014 | Han | ................... | G01N 29/2418 |
| | | | | 359/305 |
| 9,069,228 B2* | 6/2015 | Han | ....................... | G02F 1/335 |
| 9,188,953 B2* | 11/2015 | Maeng | ..................... | G03H 1/02 |
| 11,043,627 B2* | 6/2021 | Then | ...................... | H03H 9/171 |
| 2010/0301023 A1* | 12/2010 | Unrath | ................... | B23K 26/08 |
| | | | | 219/121.67 |
| 2013/0003066 A1* | 1/2013 | Han | .................... | G03H 1/2294 |
| | | | | 356/432 |
| 2013/0050787 A1* | 2/2013 | Han | ....................... | G02B 30/26 |
| | | | | 359/10 |
| 2013/0050788 A1* | 2/2013 | Maeng | ................ | G03H 1/2294 |
| | | | | 359/10 |
| 2014/0204454 A1* | 7/2014 | Li | ........................... | G02F 1/33 |
| | | | | 359/305 |
| 2015/0338718 A1* | 11/2015 | Zhang | ..................... | G02F 1/33 |
| | | | | 359/305 |
| 2020/0119255 A1* | 4/2020 | Then | .................... | H01L 29/151 |

\* cited by examiner

ACOUSTICALLY ADJUSTABLE LENSES

CROSS-REFERENCES TO OTHER APPLICATIONS

None.

STATEMENT REGARDING FEDERAL SPONSORSHIP

No part of the invention was a result of a federally sponsored research.

FIELD OF THE INVENTION

The invention pertains to the development of a system for changing the properties of the lenses to create changes in focus, magnification and optical stabilization without changing the shape of the lens or moving the lenses.

COPYRIGHT AND TRADEMARK NOTICE

A portion of the disclosure of this patent application may contain materials that is subject to copyright protection. The owner has no objection to the facsimile reproduction by anyone of the patent document or the patent disclosure, as it appears in the Patent and trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of the invention to material associated only with such marks.

BACKGROUND

The statements in this section merely provide background information related to the present disclosure and may not constitute prior art.

Lenses are used in a variety of applications, from photographic equipment to eyeglasses. Many of these lenses produce fixed magnification and are designed to focus light in a particular sensor. Cameras and telescopes allow the user to adjust the focus (as well as magnification in same cases) by creating a series of lensing stages that are physically moved to change the properties of the optical pipeline.

Acousto-optic modulators have been used in industry for several purposes including Q-switching, cavity dumping, hyperspectral imaging, and laser deflecting.

SUMMARY OF THE INVENTION

In this invention we present a system for changing the properties of the lenses to create changes in focus, magnification and optical stabilization without changing the shape of the lens or moving the lenses.

The invention uses an acoustic wave that when propagated through the lenses, creates a standing wave that changes the diffractive capabilities of the lens. The physics involve the properties of many materials to change the diffractive properties when subjected to acoustic waves.

The acoustic waves are generally accomplished with a piezo electric transducer or modulator. The frequencies used are in the RF range, depending on the substrate. Substrates used include glass and silicon, as well as more esoteric transparent materials.

BRIEF DESCRIPTION OF THE DRAWINGS

The present invention is described in the detailed description that follows, with reference to the following noted drawings that illustrate non-limiting examples of embodiments of the present invention, and in which the reference numerals represent similar parts throughout the drawings.

DETAILED DESCRIPTION OF THE INVENTION

Figure 1:
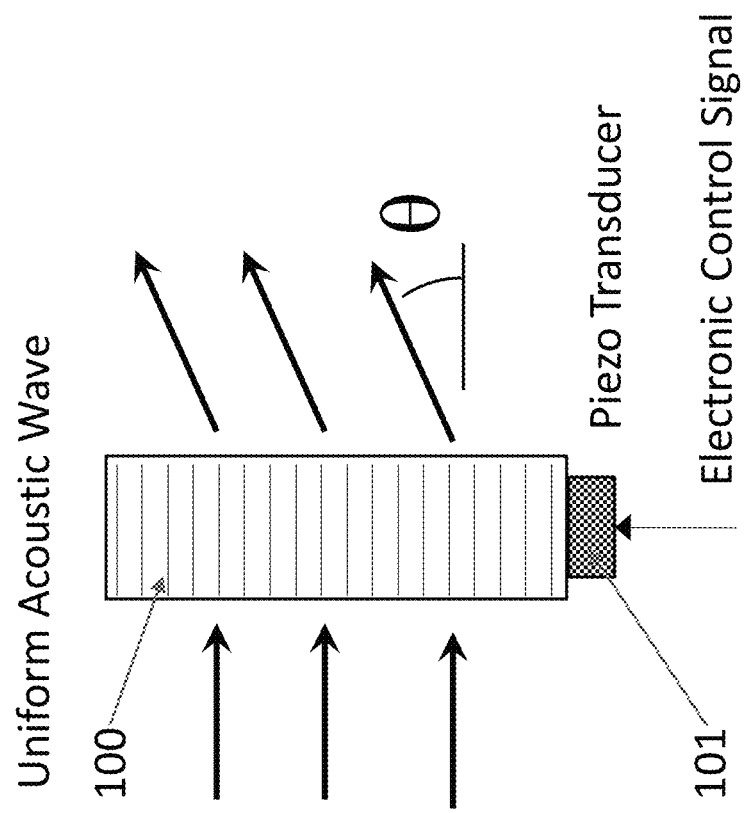
FIG. 1 shows a standard Bragg cell.

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth, the terms "a," "an," and "the" are not limited to one element, but instead should be read as meaning "at least one" The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

In this invention we present a system for changing the properties of the lenses to create changes in focus, magnification and optical stabilization without changing the shape of the lens or moving the lenses.

The invention uses an acoustic wave that when propagated through the lenses, creates a standing wave that changes the diffractive capabilities of the lens. The physics involve the properties of many materials to change the diffractive properties when subjected to acoustic waves.

The acoustic waves are generally accomplished with a piezo electric transducer or modulator. The frequencies used are in the RF range, depending on the substrate. Substrates used include glass and silicon, as well as more esoteric transparent materials.

The significant innovation of the invention is the shape of the acoustic wave being propagated that allows the substrate to be used for magnification and focusing which are not currently possible with current acousto-optic modulators.

Moreover, the stacking of these substrates with different modulators produce linear or nonlinear effects across the surface of the lens allowing for greater freedom of design and compactness.

The invention has significant advantages for cameras and eyewear allowing to create variable lenses without moving parts (or lens changes) and the possibility of creating lenses that are sufficiently slimmer and lighter. For example, one particular implementation of the invention allows to create eyewear that automatically adjusts to the focal point at different distances without changing or moving the lens.

The state of the art requires the eyeglass user to use different glasses for short and long distance or to use bifocal lenses that make the assumption that the user is viewing items at a close distance in the bottom area of the glass pane, and long distance on the top of the eyeglass.

The invention paired with a pupil tracker and optional range detector can automatically adjust to the appropriate correction at each distance throughout the glasses providing for a more comfortable experience and larger view areas in focus.

State of the art smart phones are now including two or three forward looking cameras so as to avoid adding moving parts that would allow the cameras to zoom. Using the present invention, smart phone manufacturers can use a single camera that without moving parts could still create the zoom, focusing and image stabilization functionality in a small package, all without moving parts.

One important aspect of this invention is that acoustic modulators are used in a significantly different manner than how they are currently used in industry. In most current applications acoustic modulators are used for deflectors, a fixed source of light is redirected with the acousto-optic modulator.

The pointing of the beam is accomplished by changing the frequency, therefore changing the physical location of the standing wave in the crystal which changes the index of refraction in a sign wave. In the presented invention, beams of light hit different areas of the lens. Because the standing wave has different phases throughout the lens, the coefficient of refraction is different depending on the area where the light hits. In other words, in a traditional use of an acousto-optic modulator, light from a point source enters the device on one side and exits at the far side. The point of exit, and the angle of exit, changes with changing frequency of the acoustic signal. The moving periodic standing waves create periodic planes of expansion and compression that change the index of refraction. Although the excited crystal has multiple indexes of diffraction at the different phases of the wave, only one of them is used.

In this invention, an image comprised of many rays of light that enter the lens at different points hit different parts of the lens that have different diffractive indices. Each of these beams is affected by a different phase of the standing wave, and therefore the lensing effect is accomplished.

Radial modulator with a single substrate: Acousto-optic modulators (or Bragg Cells) create longitudinal standing waves on a transparent substrate (lens). Manufacturers of these transducers take extra precautions to make sure that the longitudinal standing waves are parallel and linear. The reason is that the main uses of these devices is to bend a single beam at different angles in a plane.

In the invention the transducer in the acousto-optic modulator is located at the center of the lens (as opposed to the edge in current designs). The resulting waves propagate concentrically from the center of the lens outwards (as opposed to parallel to each other). In an equivalent embodiment, a ring-shaped transducer is located in the outer edge of the lens, and the wave propagates radially towards the center of the lens.

With either positioning of the emitter the result is similar, as a radial expanding wave on the substrate that creates concentric waves of compression and dilation in the crystalline lattice which then creates radial change of the index of diffraction. Same as with other acousto-optic modulators, the invention changes the wave with the frequency of the acoustic signal, and therefore, the angle of diffraction around the lens can be changed by changing the frequency of the acoustic wave being propagated. By controlling this frequency, different lensing effects can be accomplished.

Not all substrates currently being used in the industry can be used in this application as some of the substrates only exhibit this property in one direction and not in others. Therefore, a manufacturer must select substrates that provide multidirectional excitation characteristics. Several substrates are currently available with different levels of performance.

Utilizing layers of linear acousto-optic substrates and modulators: In this embodiment of the invention, multiple layers of linear acousto-optic modulators are used to provide the lensing effect. The light gets modified by each layer, and since the acoustic waves are non-linear, it is possible to create arbitrary resulting light pathways assuming an arbitrary high number of layers. There are a mathematically infinite number of layer combinations of layers and frequencies that can provide the same radial (or non-radial) lensing effect. This is particularly true given that the layers do not need to cover the whole lens. In other words, it is possible to achieve the same changes in diffraction as with the concentric embodiment presented above.

The number of layers used will determine the accuracy of the resulting lens. The designer should select the configuration that matches the accuracy and cost of the desired application. As more layers are added, the transmissivity of the pipeline will decline. With new materials, this is not a problem for most application as substrates a highly transparent. Additionally, a deliberate reduction in transmission may be advantageous in certain circumstances such as sunglasses of protective eyewear.

Non-Spherical lenses: At this point, it should be clear to the reader that the standing waves do not need to produce a radial diffraction effect. To the contrary, the method can be used to create arbitrary lensing effects that can be changed at the frequency of the underlying acoustic wave. Because the frequencies used for transducers are usually in the GHz, the presented invention can change the properties of the lens at frequencies that cannot be humanly perceived.

Other embodiments may contain a mixed of radial and linear layers for astigmatic lensing or may create transducers with arbitrary shapes that create waves of arbitrary shapes that can be used individually or in layers for specialized applications.

Other properties of the invention: In previous sections, we presented that the method could generate arbitrary lensing effects that can be changed at very high speed. These capabilities can be used for purposes other than just zoom and focus. In particular, other common problems solved with pipelines of moving lenses can now be solved with a single lens or a stationary combination of lenses with emitters at each layer.

Because the linear layers can change the angle of incidence, the invention is also capable of performing optical image stabilization at speeds that are significantly faster than state of the art mechanical or piezo methods. This image stabilization can be performed around the three Euler angles.

Because the arbitrary lensing effect can allow the creation of arbitrary lenses, the system can also be used to correct for astigmatism.

Uses of the Invention

Automatic eyeglasses: The invention can be used with eyeglasses to produce changing focus eyeglasses. As a person ages, the lens in their eye typically becomes less flexible and can no longer adjust the focus unaided. The person may need multiple pairs of glasses for reading, distance, and mid-field viewing. Alternatively, they may get bifocal lenses or progressive lenses where different parts of the lens is for distance, mid-range, or close up viewing. In this case, the head must be moved so that the appropriate part of the lens is between the eye and the thing being viewed. In the invention, the entire lens will adjust to the correct focal length. in conjunction with a range sensor, an eye tracker, or both.

In this case the invention follows the following steps:
the range sensor measures the distance in each area of the field of view of the optic;
the eye tracker determines what part of the image is being viewed by the user;
the controller for the system determines the frequencies to stimulate the modulators so as to provide the lensing correction needed by the user (given the distance to the subject that the user's pupil is looking at);
The transducers generate the standing wave that provides the desired lensing effect in the correct region of the lens;
The light passing through the active region of the lens is corrected to create a focused image for the user A similar embodiment eliminates the distance sensor and uses the eye tracker to focus the lens with corrections for long distance on the upper parts of the lens and focuses closer as the user gazes down towards the bottom of the lens.

Smart phone camera: As mentioned earlier, state of the art smart phones often include multiple imagers with different fixed lenses to minimize the size of the cameras and eliminate the moving parts required by zoom lenses. With the current invention, phone manufacturers can use a single stationary lens or lens assembly that provides both zooming, focusing and image stabilization without moving parts.

FIG. 1 depicts a standard Bragg cell (100) with a piezo transducer (101). A piezoelectric transducer is attached to a material such as glass or quartz. An oscillating electric signal causes the transducer to vibrate. This produces a compression wave, i.e., a sound wave, in the material. This sound wave changes the optical properties of the material. Light passing through the material will diffract at an angle dependent on the frequency of the sound wave. Changing the frequency will change the output angle. The acoustic wave can be a traveling wave or a standing wave. A single frequency input produces a uniform acoustic wave resulting in a uniform output angle.

Figure 2:
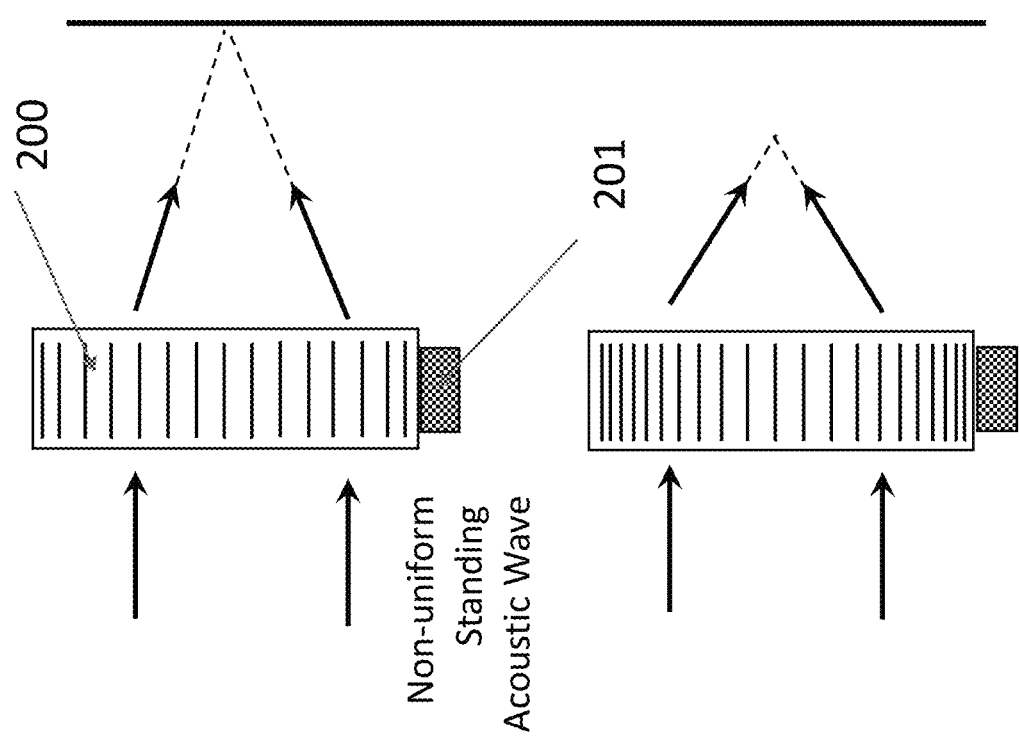
FIG. 2 shows that a non-uniform standing acoustic wave produces non-uniform output angles and produces a cylindrical lens.

FIG. 2 illustrates the concept behind the invention, in which a non-uniform standing acoustic wave produces non-uniform output angles. An appropriate acoustic wave will produce a cylindrical lens. Adjusting the acoustic wave can adjust the lens properties including the focal length. The Bragg cell is shown in 200 and the piezo transducer is shown in 201.

Figure 3:
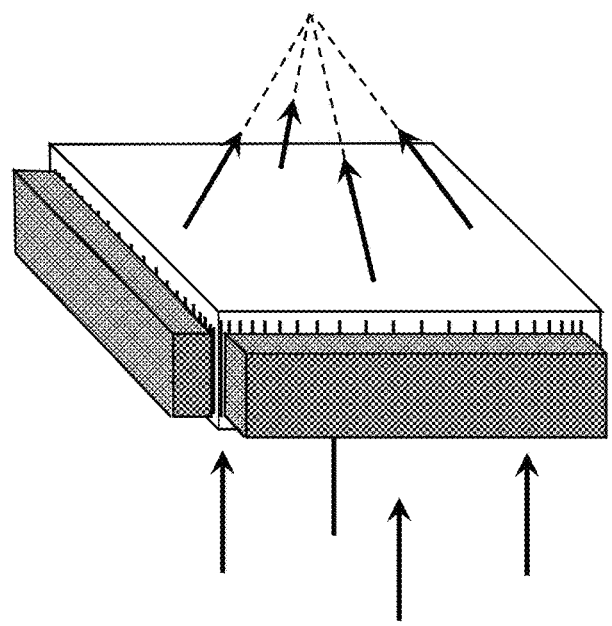
FIG. 3 shows that mounting two devices at 90 degrees produces a 2D lens effect with an adjustable focal length and this can also be created by attaching the two piezo transducers to the same material at 90 degrees.
Figure 3:
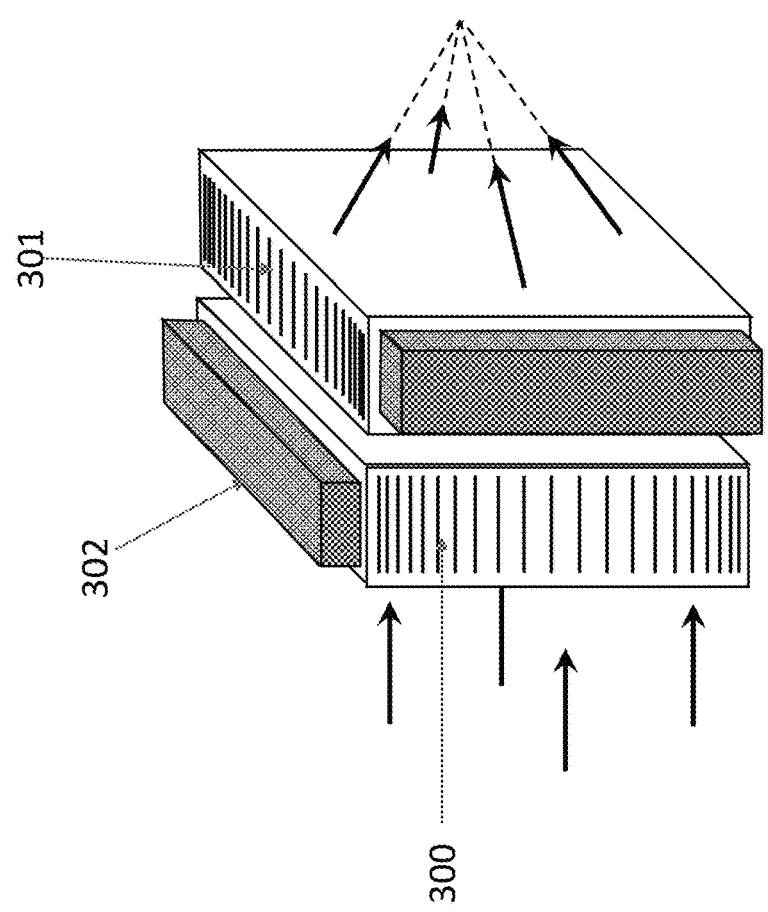

FIG. 3 illustrates mounting two of the Bragg cell devices (300, 301) at 90 degrees which produces a 3-D lens effect with an adjustable focal length. In addition, a similar effect can be created by attaching the two piezo transducers to the same material at 90 degrees.

Figure 4:
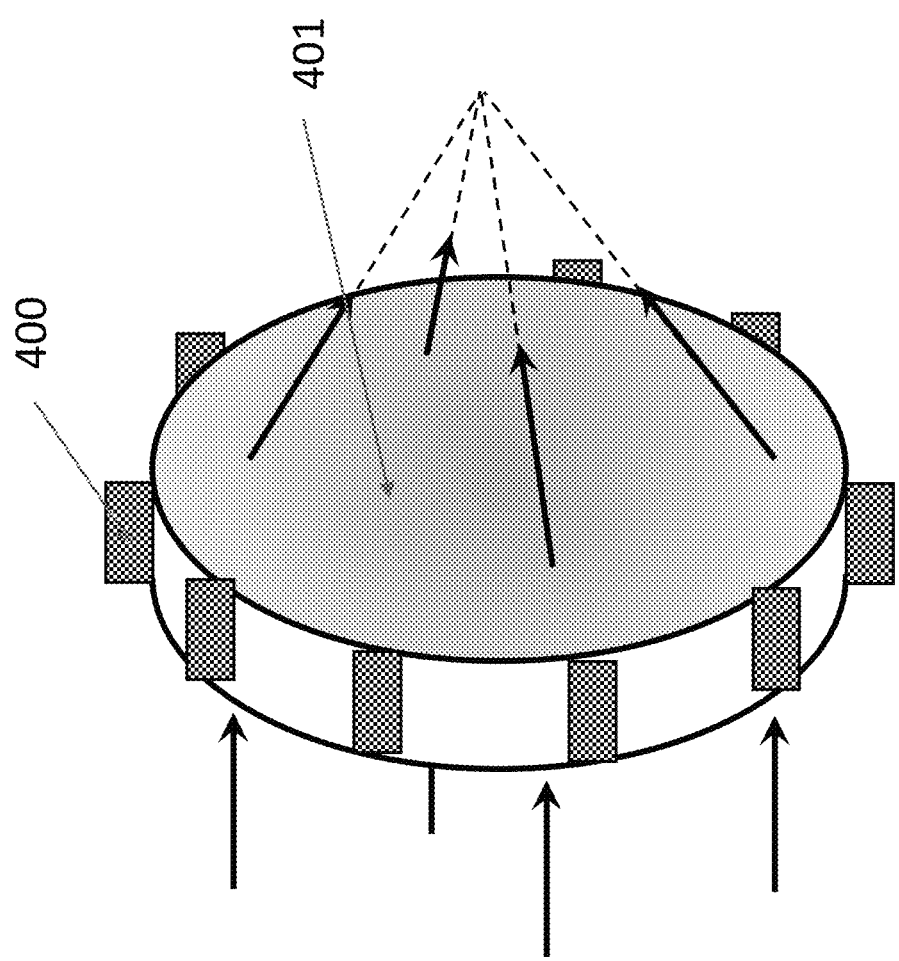
FIG. 4 shows that multiple piezo transducers mounted around the circumference of a cylindrical block of material produces a concentric standing wave.

FIG. 4 illustrates multiple piezo transducers (400) mounted around the circumference of a cylindrical block of material (401) which produces a concentric standing wave. This results in a smooth spherical 3-D lens with an adjustable focal length. The multiple transducers can be replaced by a single ring-shaped transducer.

Figure 5:
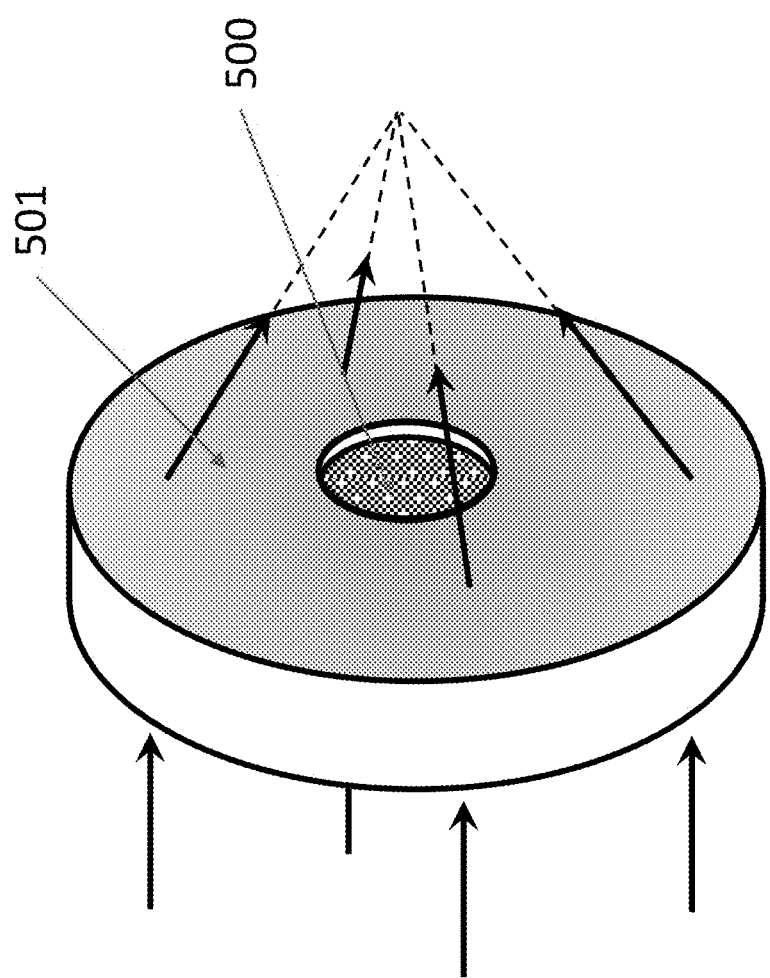
FIG. 5 shows that a single piezo transducer mounted in the center of the material also produces a concentric wave that results in a spherical lens with a hole in the middle.

FIG. 5 shows that single piezo transducers (500) mounted in the center of the material (501) will also produce a concentric wave that results in a spherical lens, albeit with a hole in the middle.

Figure 6:
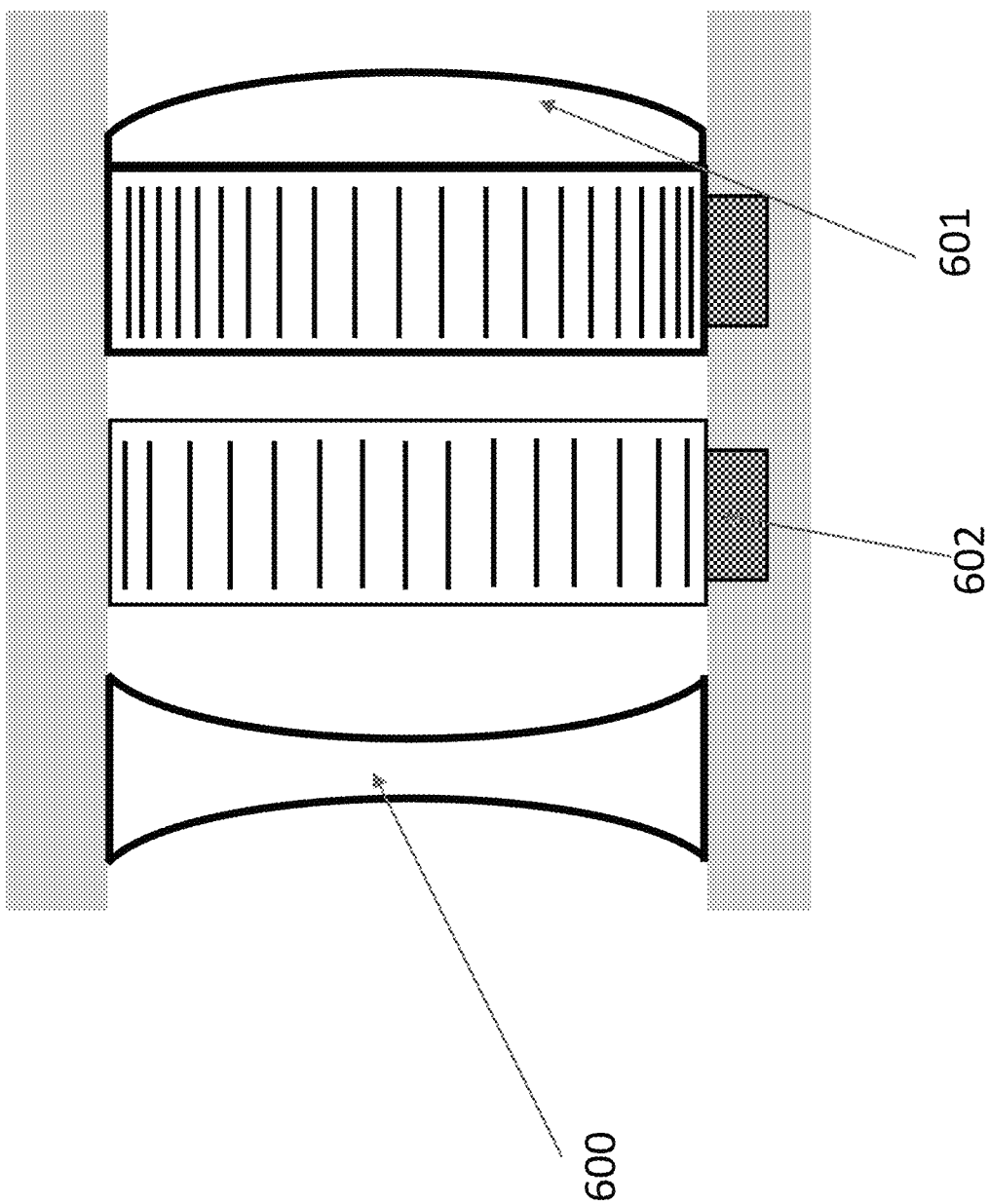
FIG. 6 shows that compound lenses can be obtained by combining multiple lenses, both fixed lenses and Bragg cell-based lenses with or without air gaps.

FIG. 6 shows that compound lenses (600) can be obtained by combining multiple lenses, both fixed lenses and Bragg cell-based lenses (601), with or without air gaps. This can produce a compound lens with electronically adjustable focus and zoom.

An acousto-optic modulator (AOM), also called a Bragg cell, uses the acousto-optic effect to diffract and shift the frequency of light using sound waves (usually at radiofrequency). They are used in lasers for Q-switching, telecommunications for signal modulation, and in spectroscopy for frequency control. A piezoelectric transducer is attached to a material such as glass. An oscillating electric signal drives the transducer to vibrate, which creates sound waves in the material. These can be thought of as moving periodic planes of expansion and compression that change the index of refraction. Incoming light scatters (see Brillouin scattering) off the resulting periodic index modulation and interference occurs similar to Bragg diffraction. The interaction can be thought of as a three-wave mixing process resulting in Sum-frequency generation or Difference-frequency generation between phonons and photons.

The invention describes a new lensing mechanism that comprises one ore more acousto-optic modulator(s), a transparent or semi-transparent substrate where the modulation is applied, and a non-parallel standing wave being propagated in the substrate.

In the system described in the present invention, the acousto-optic modulators are placed sequentially to produce a lensing pipeline.

In this system, the modulators create a concentric standing wave. Standing wave, also called stationary wave, are a combination of two waves moving in opposite directions, each having the same amplitude and frequency. The phenomenon is the result of interference—that is, when waves are superimposed, their energies are either added together or cancelled out.

In the system, the modulators creates a deformed wave that corrects for astigmatism. Astigmatism is a common vision condition that causes blurred vision. It occurs when the cornea (the clear front cover of the eye) is irregularly shaped or sometimes because of the curvature of the lens inside the eye. As a result, vision becomes blurred at any distance. This can lead to eye discomfort and headaches.

In the system described in the present invention, the len/es create zoom and focus corrections. Also, the len/es adjust for angular stabilization.

The system is also enhanced with an eye tracker and is also an enhanced distance sensor. The lens/es have a reflective surface. A reflective surface is one that can bounce back light—like the reflective sunshade that you put over the windshield of your car. It bounces the sun's rays away, helping the interior cool.

In the system described in the present invention, the lenses also have a traditional lens mixed in the pipeline. Also, the pipeline has a mirror. The pipeline also inverts the image.

The system is mounted directly over an imaging sensor or imager and the substrate(s) are flexible contact lenses. The system is embedded into a flexible structure which are the contact lenses.

In the system, the piezo transducers are excited remotely through RF rather than by direct wiring. Piezoelectric transducers are a type of electroacoustic transducer that convert the electrical charges produced by some forms of solid materials into energy. The word "piezoelectric" literally means electricity caused by pressure. RF is radio-frequency input. Direct wire fixtures are self-contained, meaning all of the elements needed to operate the light are contained within a single unit. They require a separate 120V power feed from the wall but can be linked (fixture to fixture) once the first connection is established.

The system described in the present invention is mounted on a helmet or can be mounted on contact lenses or can be mounted on a telescope or as part of a stage in a telescope.

In the system of the present invention, the excitation of the substrate is accomplished by an RF transducer rather than an acoustic transducer or using a magnetic transducer. Phonons, polaritons, or magnons can be used depending on the material excitation properties. Radio frequency (RF) transmitter is a circuit which consists of transducer, modulator, waveguide, and an antenna used to transmit radio waves. Some circuits need not have a modulator when the range of receiver (consists of same blocks as transmitter but performs a reverse operation) is nearby to transmitter.

Electromagnetic acoustic transducer (EMAT) is a transducer for non-contact acoustic wave generation and reception in conducting materials. Its effect is based on electromagnetic mechanisms, which do not need direct coupling with the surface of the material. Due to this couplant-free feature, EMATs are particularly useful in harsh, i.e., hot, cold, clean, or dry environments. EMATs are suitable to generate all kinds of waves in metallic and/or magnetostrictive materials. Depending on the design and orientation of coils and magnets, shear horizontal (SH) bulk wave mode (nom-beam or angle-beam), surface wave, plate waves such as SH and Lamb waves, and all sorts of other bulk and guided-wave modes can be excited. [1] [2] [3] After decades of research and development, EMAT has found its applications in many industries such as primary metal manufacturing and processing, automotive, railroad, pipeline, boiler and pressure vessel industries, [3] in which they are typically used for nondestructive testing (NDT) of metallic structures.

The magnetic flux from a magnet produces a bias magnetic field at the tip of the iron core, drawing a diaphragm toward itself by a suitable force. If electric signals (for example, rectangular shaped voltage with a frequency of 3.2 KHz and 1.5 Vo-p) coming intermittently at a fixed frequency from an external oscillating circuit are input, an electric current will intermittently flow through the coil, generating an intermittent magnetic field at the tip of the iron core.

Phonons are a quantum of energy or a quasiparticle associated with a compressional wave such as sound or a vibration of a crystal lattice. n physics, polaritons are quasiparticles resulting from strong coupling of electromagnetic waves with an electric or magnetic dipole-carrying excitation. They are an expression of the common quantum phenomenon known as level repulsion, also known as the avoided crossing principle. A magnon is a quasiparticle, a collective excitation of the electrons' spin structure in a crystal lattice.

In the system that is described in the invention, the substrate can be a liquid. A temperature sensor is used to compensate for changes in the substrate. An image is used to tune or provide control feedback to the lens. The lenses are used to automatically hide specs of dust or scratches that are deposited on the lens.

In the system described in the present invention, a gyroscope is used to provide guidance to the controls system to provide optical image stabilization A gyroscope is a device consisting of a wheel or disk mounted so that it can spin rapidly about an axis which is itself free to alter in direction. The orientation of the axis is not affected by tilting of the mounting, so gyroscopes can be used to provide stability or maintain a reference direction in navigation systems, automatic pilots, and stabilizers.

In the system described in the present invention, an imager is added, and the lens is used to temporarily block high intensity events by redirecting the rays out of the area of the imager.

The lens is used to create a simulated aperture by redirecting some of the rays out of the imager or eye in the system described in the present invention. The lens is used to redirect images to areas of the imager or eye that are functioning. This could be used for users with macular degeneration. Age-related macular degeneration—also called macular degeneration, AMD or ARMD, is deterioration of the macula, which is the small central area of the retina of the eye that controls visual acuity.

The embodiments of the invention in which an exclusive property or privilege is claimed are defined as follows:

1. A new lensing system mechanism comprising: a) One or more acousto-optic modulator(s) b) A transparent (or semi-transparent) substrate(s) where the modulation is applied c) A non-parallel standing wave being propagated in the substrate.

2. The system of claim 1 wherein the acousto-optic modulators are placed sequentially to produce a lensing pipeline.

3. The system of claim 2 wherein the lenses also have a traditional lens mixed in the pipeline.

4. The system of claim 2 wherein the pipeline also has a mirror.

5. The system of claim 2 wherein the pipeline inverts an image.

6. The system of claim 1 wherein the modulators create a concentric standing wave.

7. The system of claim 1 wherein the modulators creates a deformed wave that corrects for astigmatism.

8. The system of claim 1 wherein the lens/es create zoom, focus corrections.

9. The system of claim 1 wherein the lens/es adjust for angular stabilization.

10. The system of claim 1 wherein the system is enhanced with an eye tracker.

11. The system of claim 1 wherein the system is enhanced distance sensor.

12. The system of claim 1 wherein the lens/es have a reflective surface.

13. The system of claim 1 wherein the system is mounted directly over an imaging sensor or imager.

14. The system of claim 1 wherein the substrate(s) are flexible (contact lenses).

15. The system of claim 1 wherein the system is embedded into a flexible structure (contact lenses).

16. The system of claim 1 wherein the system comprises piezo transducer(s), wherein the piezo transducers are excited remotely through RF rather than direct wiring.

17. The system of claim 1 wherein the system is mounted on eyewear.

18. The system of claim 1 wherein the system is mounted on a helmet.

19. The system of claim 1 wherein the system is mounted on contact lenses.

20. The system of claim 1 wherein the system is mounted on a telescope or as part of a stage in a telescope.

21. The system of claim 1 wherein the excitation of the substrate is accomplished by an RF transducer rather than an acoustic transducer or using a magnetic transducer, in other words, phonons, polaritons or magnons can be used depending on the material excitation properties.

22. The system of claim 1 wherein the substrate is liquid.

23. The system of claim 1 where a temperature sensor is used to compensate for changes in the substrate.

24. The system of claim 1 where an imager is used to tune or provide control feedback to the lens.

25. The system of claim 1 where the lenses are used to automatically hide specs of dust or scratches deposited on the lens.

26. The system of claim 1 where a gyroscope is used to provide guidance to the controls system to provide optical image stabilization.

27. The system of claim 1 where an imager is added, and the lens is used to temporarily block high intensity events by redirecting the rays out of the area of the imager.

28. The system of claim 1 where the lens is used to create a simulated aperture by redirecting some of the rays out of the imager (or eye).

29. The system of claim 1 where the lens is used to redirect images to areas of the imager (or eye) that are functioning, this could be used for users with macular degeneration.

* * * * *